(12) United States Patent
Singh (10) Patent No.: US 11,748,127 B2
(45) Date of Patent: Sep. 5, 2023

(54) DYNAMIC NAVIGATION SYSTEM

(71) Applicant: SAP SE, Walldorf (DE)

(72) Inventor: Amit Singh, Gurugram (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/578,739

(22) Filed: Jan. 19, 2022

(65) Prior Publication Data

US 2023/0229465 A1    Jul. 20, 2023

(51) Int. Cl.
*G06F 3/048*     (2013.01)
*G06F 9/451*     (2018.01)
*G06F 3/0482*    (2013.01)

(52) U.S. Cl.
CPC ............ *G06F 9/453* (2018.02); *G06F 3/0482* (2013.01)

(58) Field of Classification Search
CPC .............................. G06F 3/0482; G06F 9/453
See application file for complete search history.

(56) References Cited

U.S. PATENT DOCUMENTS

2005/0235208 A1* 10/2005 Arend ................ G06F 3/0481
                                                          715/792
2016/0104159 A1*  4/2016 Butterfield .......... G06Q 20/223
                                                          705/44
2020/0097247 A1*  3/2020 Molina ................ G06F 16/252

* cited by examiner

*Primary Examiner* — Claudia Dragoescu
(74) *Attorney, Agent, or Firm* — Sterne, Kessler, Goldstein & Fox P.L.L.C.

(57) ABSTRACT

Various embodiments for customizing a dynamic navigation system are described herein. An embodiment operates by identifying an activity to be performed by a user, the activity including a plurality of steps to be performed by the user using a plurality of screens of a data input portion of a user interface. The user interface is provided for display, the user interface including the data input portion and a navigation pane. A selectable visual sequence of steps corresponding to the plurality of steps to be performed by the user with regards to the activity is provided for display in the navigation pane. A record of the database corresponding to information displayed in the data input portion of the user interface is identified. First data of the database corresponding to the identified record is retrieved and provided for display in the navigation pane portion.

20 Claims, 5 Drawing Sheets

DYNAMIC NAVIGATION SYSTEM

BACKGROUND

It is often difficult for new users to gain familiarity with new systems, particularly new enterprise or data management systems that manage data across an organization or project. These data management systems often have very little guidance or instructions that are available to users. Instead these systems offer numerous, often complex interfaces in which users are expected to already know what to do to enter or modify data in performing transactions or performing various activities.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is often difficult for new users to gain familiarity with new systems, particularly new enterprise or data management systems that manage data across an organization or project. These data management systems often have very little guidance or instructions that are available to users. This lack of guided navigation or any pictorial depiction of an end-to-end business cycle makes it even more difficult for a user to understand a context or purpose of various application functions. Instead these systems offer numerous, often complex interfaces in which users are expected to already know what to do to enter or modify data in performing transactions or performing various activities.

Figure 1:
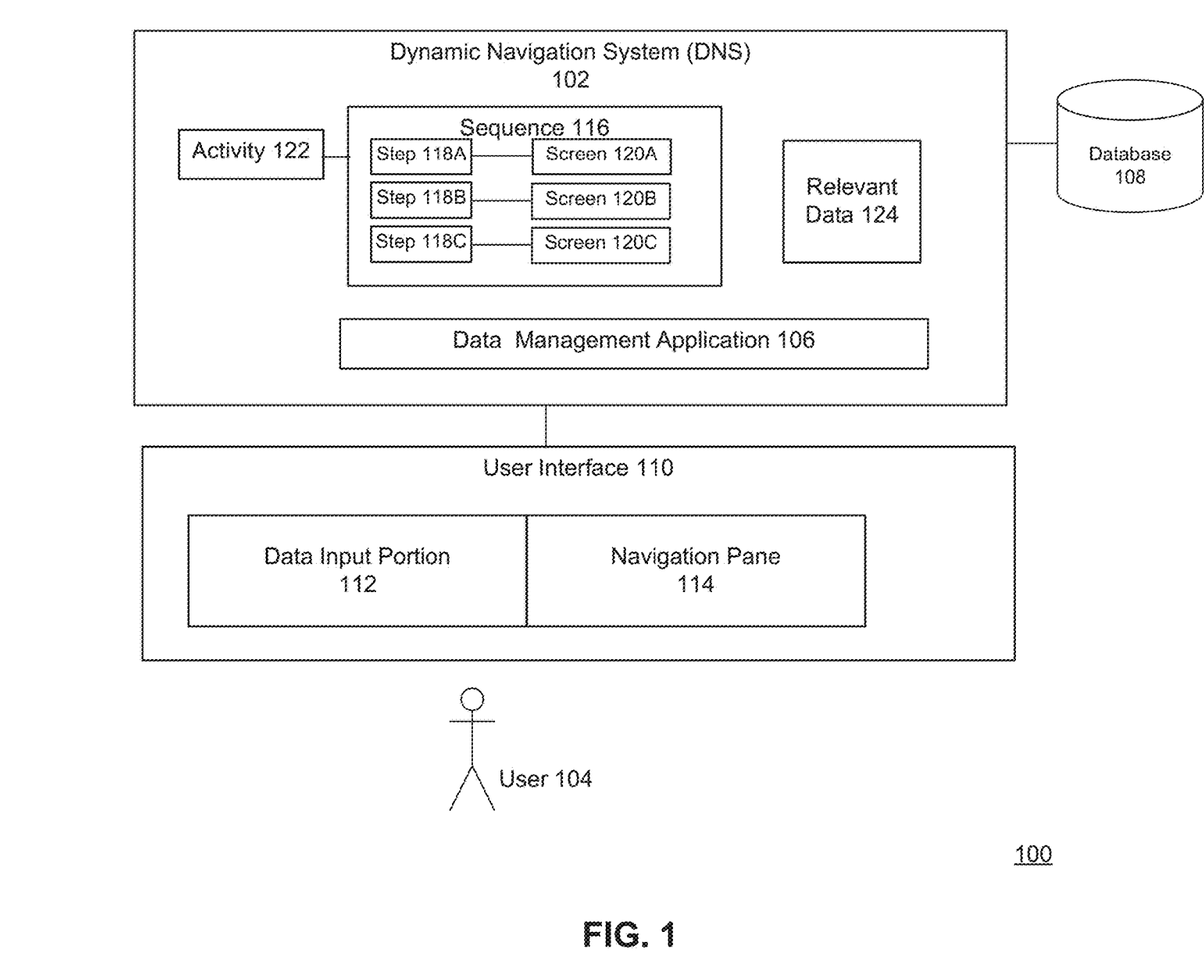
FIG. 1 illustrates a block diagram of a dynamic navigation system (DNS), according to some example embodiments.

FIG. 1 illustrates a block diagram 100 of a dynamic navigation system (DNS) 102, according to some example embodiments. DNS 102 may help a user 104 navigate a data management application 106 (referred to herein as application 106) by providing guidance and relevant information for the tasks or activities a user is performing. DNS 102 may generate a user interface 110 that prevents a user from needing to switch between multiple systems, programs, screens, or interfaces, by providing all the relevant information a user 104 may need on a single, customizable user interface 110. DNS 102 may also provide a pictorial or graphical depiction of an end-to-end business cycle that makes it easier for a user to understand business functions.

Application 106 may include any app, program, or software that enables a user to manage data of an organization. For example, application 106 may be used to track the finances, human resources, customer orders, supply chain logistics, equipment, or other organizational information, In some embodiments, application 106 may be a web or cloud based program accessible from and/or by multiple computing devices, and the organizational data accessed or updated by application 106 may be stored on a database 108.

Database 108 may include any data storage mechanism configured to store and make available or distribute data. Database 108 may include a relational database, in-memory database, cloud storage, or another set of multiple networked computers across which data is stored, distributed, and/or otherwise made accessible.

In some embodiments, DNS 102 may generate a user interface 110 for the application 106 which helps guide the user through various stages of data input and modification of data stored in database 108 and/or by application 106. For example, application 106 may include one or more screens 120A-C (referred to generally as screen or screens 120) enabling a user to enter new data, or modify/delete existing data in performing one or more functions or an activity 122.

DNS 102 may generate a user interface 110 that is configured to display the one or more screens 120 of application 106 via a data input portion 112 of the user interface 110. DNS 102 may also concurrently display (or make available for display) an additional navigation pane 114 to help guide the user 104 in using application 106 or entering data on the screen 120 displayed in data input portion 112 of the user interface 110. The navigation pane 114 may be displayed simultaneously with the data input portion 112, and may provide the user 104 with help, guidance, and other information related to the screen 120 displayed in the data input portion 112 as generated by application 106. In sonic embodiments, navigation pane 114 may be customized based on the role of the user 104 within an organization.

In some embodiments, navigation pane 114 may include an order or sequence 116 of steps 118A-C (referred to generally as step or steps 118) that a user 104 is to perform in completing a particular activity 122. Activity 122 may be a specified action that the user 104 wants to perform using application 106, and may include multiple steps 118 to be performed across multiple different screens 120. Examples of activity 122 include, but are not limited to, creating a new client account, creating a new contract or sales order, changing an existing sales order, entering a new employee, updating payroll or finance information, removing an employee record from database 108, etc.

For example, to create a new client or contract account may require a user to perform eight different steps 118 across six different screens 120 of application 106. Unless a user 104 has performed this activity 122 multiple times and has already memorized what needs to be done to create a new client account, the activity could be very confusing and time consuming. Also, even if a user 104 is familiar with what actions needs to be performed, the actions may still require the user 104 to go back-and-forth between different programs verifying data that may have been stored in database 108.

As such, DNS 102 may make performing certain predefined tasks or activities 122 easier for a user 104 by providing a navigation pane 114 that may include, amongst other features, a sequence 116 with selectable steps 118A-C and relevant data 124. In some embodiments, a user 104 may use their mouse or finger (on a touch screen device) to select any of steps 118 for activity 122 from navigation pane 114. DNS 102 may then display the corresponding screen 120 of application 106 in data input portion 112.

In some embodiments, the user 104 may only be allowed to select a subset of the steps 118 displayed in navigation pane 114 because certain later steps 118 may rely on information to be provided via earlier steps 118 or actions to be performed by other parties. The steps 118 may still be displayed, but may be greyed out, displayed with smaller or different color text, italicized, or otherwise rendered unselectable from user interface 110, while other selectable steps 118 are displayed with greater or different visual prominence.

In some embodiments, a user 104 may provide a sequence 116 of steps 118 to be provided via navigation pane 114 to other users. In other embodiments, the sequence 116 for an activity 122 may be retrieved from application 106 or database 108. This sequence 116 information may identify the labels for steps 118, which fields of which screens 120 correspond to each step and require information, and what data or records of database 108 are relevant to each step 118 and/or screen 120.

In some embodiments, navigation pane 114 may include relevant data 124 that provides a user 104 with additional information retrieved from database 108 or other systems that may be related to what screen 120 is displayed in data input portion 112 and/or the current or active step 118 from navigation pane 114.

In some embodiments, relevant data 124 may include data that was previously entered by user 104 in previous steps 118 or on different screens 120 and which may provide additional value or context to the user 104 in performing the current step (so the user does not have to switch back-and-forth between screens 120 or steps 118 or try and remember what data was previously entered or displayed).

Users 104, including technical, functional, end, and business users, all face the common issue of navigating to the next related transactions or step 118 which should be executed in the specified sequence only to complete the business cycle or activity 122. This would ordinarily require user 104 to memorize all the relevant transactions or steps 118 which are useful as part of their role in an organization and manually execute the steps 118 in a specified sequence. This is an extremely tedious task as new custom and standard transactions or steps 118 can be added or removed from an activity 122, For example, updates to application 106 may change the steps 118 and/or screens 120 required to perform activity 122, which would then require users 104 to again memorize or relearn how to perform the activity 122.

In some embodiments, application 106 may include various transactions codes that may be related to calculated fields (e.g., fields related to currency, volume, quantity, etc.) which are stored in multiple corresponding and often nested tables in database 108. It would be tedious for a user 104 to check all the calculations and other data in all these many associated database tables, because it would require the user 104 to open all these database tables in parallel and may even require multiple computing sessions to understand all of the calculations.

DNS 102 simplifies this process and prevents the user from having to directly access the database 108 using another computing session or program, by importing relevant data 124 directly from database 108 into navigation pane 114. For example, if a screen 120 in data input portion 122 performs a particular calculation using data stored in database 108, DNS 102 may retrieve the data used in the calculation and display it in navigation pane 114 as relevant data 124, The user 104 may then quickly confirm or verify the calculation appearing on the screen 120 without switching to a different program or computing session.

in some embodiments, some later steps 118 of sequence 116 for performing activity 122 may rely on or require information provided in earlier steps 118. Rather than requiring a user 104 to copy and paste, or memorize and re-write this data, which opens the door for human error, DNS 102 may identify which information is re-used and automatically import or autofill the information of previous steps 118, even from different screens 120, into the current or later steps 118. This will help reduce unnecessary computing cycles which would be wasted in switching back-and-forth between different screens 120 and potential copy-paste errors of the wrong information.

In some embodiments, navigation pane 114 may be customizable by user 104. For example, the navigation pane 114 may be turned on/off or minimized/maximized. In some embodiments, user 104 may adjust how much (e.g., what percentage, how many pixels, etc.) of user interface 110 is used by navigation pane 114 and how much is used by data input portion 112, adjusting both the height and/or width of the navigation pane 114. In some embodiments, user 104 may also customize what relevant data 124 (from database 108) is displayed in navigation pane 114, or navigation pane 114 may otherwise be configured based on a role of user 104.

Navigation pane 114 may allow user 104 to understand what is the status of the business cycle or activity 122. For example, navigation pane 114 may indicate what transactions or steps 118 were previously executed before the current transaction or step 118, and which steps 118 are currently executable and/or remain before a completion of the activity 122. In some embodiments, the visual appearance of steps 118 may indicate which user's) 104 are responsible for which steps 118. For example, the steps 118 may be color coded for different users.

In some embodiments, the data entered into the data input portion 112 may be communicated back to and used to update data in database 108. This updated data may then be re-retrieved by DNS 102 and displayed as relevant data 124 in navigation pane 114.

Figure 2:
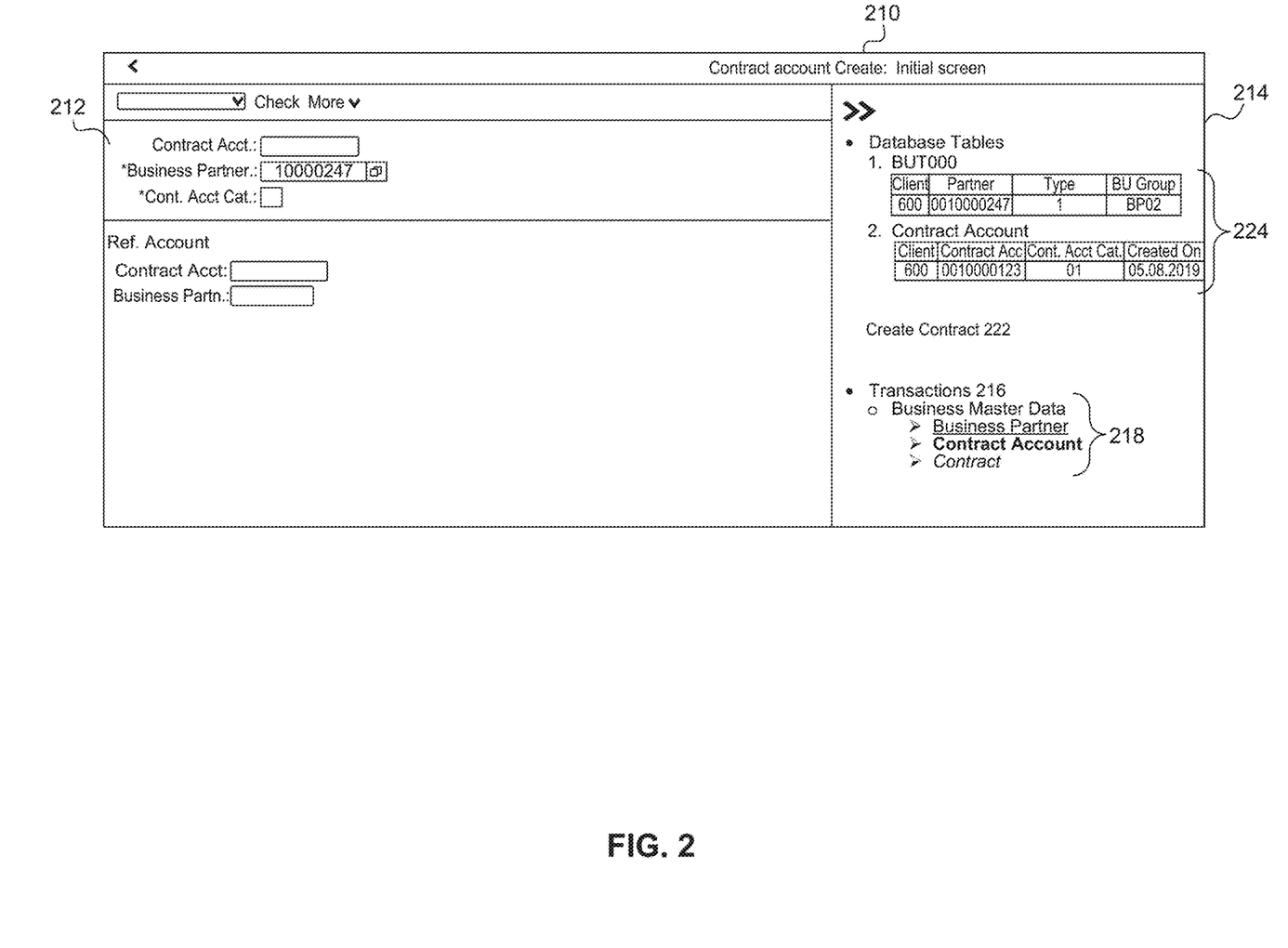
FIG. 2 is an example screenshot of a user interface of a dynamic navigation system (DNS), according to some example embodiments.

FIG. 2 is an example screenshot of a user interface 210 of a dynamic navigation system (DNS) 102, according to some example embodiments. The user interface 210 includes both a data input portion 212 displaying one or more screens 120 of application 106, and a navigation pane 214.

In the illustrated example, navigation pane 214 includes relevant data 224 from one or more database tables of database 108. The table names from which the records or data are retrieved are illustrated and displayed in the navigation pane 214 as "BUT000" and "Contract Account".

The first record may correspond to what is displayed or has been entered in the data input portion 212. For example, the business partner number "1000247" in the input box of data input portion 212 corresponds to the partner number in the first record of navigation pane 214, which may have been used to retrieve a relevant record from database 108. The relevant data 224 may be retrieved from multiple records, but is related to each other and what is displayed on the data input portion 212 of the user interface 210. For example, both illustrated records 1 and 2 correspond to the same client number "600". The second record is associated with a contact account which may correspond to the current step 218.

As illustrated the selected business cycle activity may be create contract 222. Navigation pane 214 may also include a sequence of transactions 216 that the user must perform to complete the create contract 222 activity. As illustrated, the steps 218 may be displayed in the order in which they are recommended to be or must be performed. For example, contract account information may be provided after business partner information.

Navigation pane 214 includes a sequence 216 of steps 218 related to a create account activity or transaction 222. As illustrated the various steps 218 may include different visual characteristics, the varying visual characteristics corresponding to and communicating to a status of the steps 218.

For example, the bolded step "Contract Account" may correspond to the step currently in progress or for which the corresponding screen is displayed in data input portion 212. The underlined step "Business Partner" may indicate that these transactions or actions have already been executed, the data has been received/retrieved and/or saved. The user can select click and navigate to these steps. In some embodiments, underlined steps 218 may correspond to any selectable or actionable steps. In some embodiments, a selectable step that still requires information may appear in a first color, while a selectable step that has already been performed may appear in a different color.

The greyed out or italicized step "Contract" may indicate a disabled transaction which is unclickable for a user due to lack of permissions or because a pre-requisite step has not yet been completed or saved, or that is to be performed by a different user. In some embodiments, once the required pre-requisite information has been received or saved, the italicized step may become enabled and clickable by a user 104. In some embodiments, the visual appearance of a step 218 may change once any prerequisites to perform the step are fulfilled and the step becomes selectable.

In some embodiments, an activity or business cycle may include many different transactions 216 or screens. Each step 218 may include various transaction codes required to be input by the user, and each transaction saves its transactional data in many multiple nested database tables in database 108. This data can include various calculated or otherwise derived fields such as currency, quantity, and volume which could rely on data stored in many different standard and custom database tables. In some embodiments, navigation pane 214 may include these transaction codes and pre-fill them in the corresponding fields where needed automatically for the user.

As illustrated, navigation pane 214 may provide a hawk eye view of all the related database tables in a single screen without opening multiple sessions and screens for database tables. In some embodiments, navigation pane 214 may show records in a scrollable manner which are directly related to the data displayed on the transaction screen via key relationship. This may enable a user 104 to view all the fields of a database tables just on the right side of the transaction screen in the navigation pane 214. This may enable the user 104 to quickly and from a single screen see how the calculated columns of the database table are calculated and what values are stored in the table fields. Absolutely no new window is required to be opened for viewing database table fields.

In some embodiments, the navigation pane 214 enables the user 104 to identify all the related transactions which would be impacted if user changes anything on the current screen in data input portion 212. Thereby giving user a perspective about the regression of the change in data in one transaction.

Figure 3:
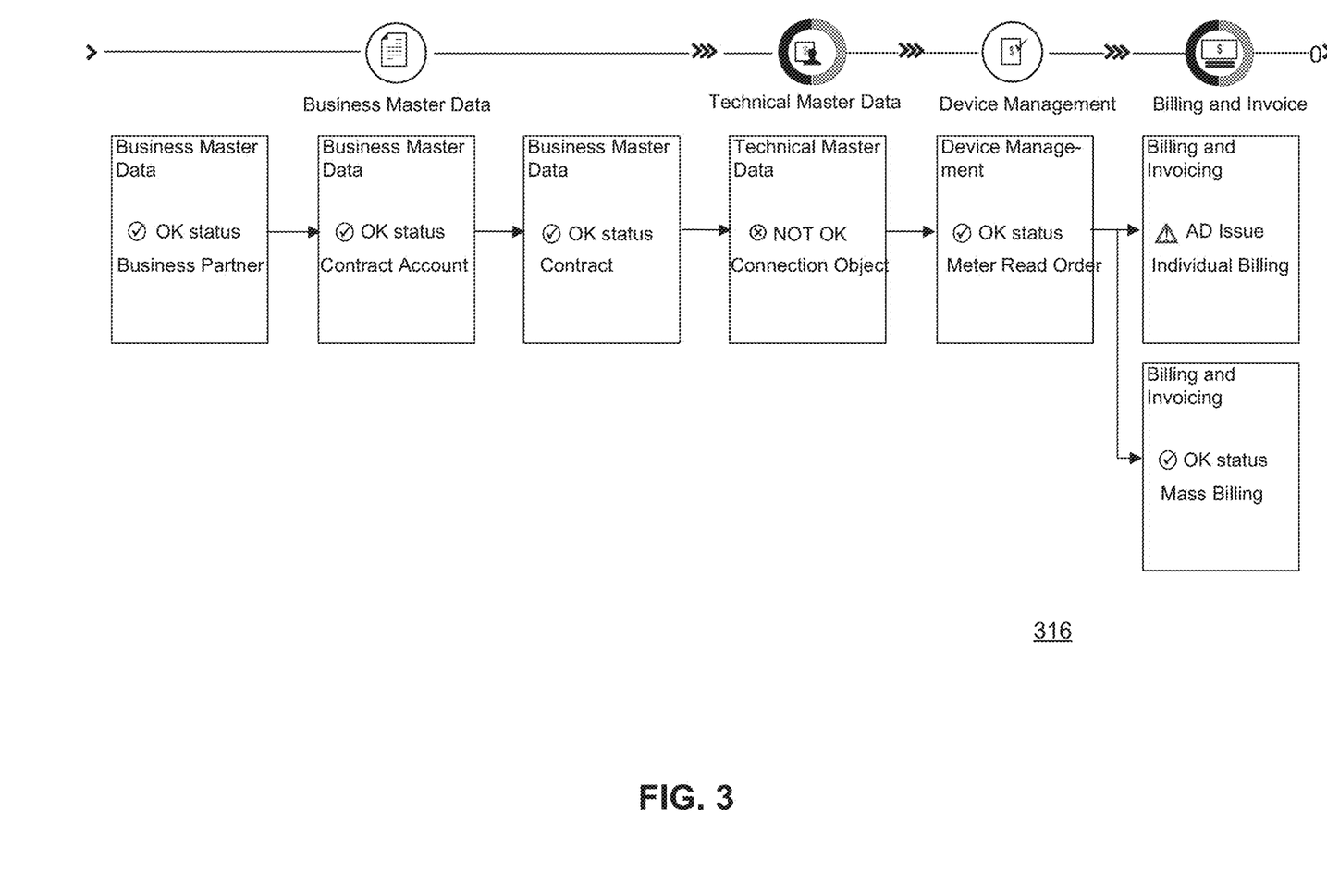
FIG. 3 is an example screenshot of a sequence of tasks related to a business cycle, according to some embodiments.

FIG. 3 is an example screenshot of a sequence of tasks related to a business cycle, according to some embodiments. It can be extremely difficult for users to understand business cycle or what steps or tasks are required to perform a particular activity 122 when there is no pictorial or graphical depiction of the business cycle available to end users. This is further complicated when there are multiple parties with different responsibilities involved in a particular process.

In an embodiment, the navigation pane 114 may include a selectable button, which may be labeled 'process flow.' Responsive to these selection, DNS 102 may generate or display a sequence 315 in navigation pane 114, in data input portion 112, or in a new window accessible to the user.

In addition to providing a graphical indication or the sequence of what steps are to be performed, sequence 316 also includes a status of each step. Example status indicators include, but are not limited to: in-progress, completed, error, not-yet-started, or a percentage indicator indicating how much of the step has been completed or remains to be completed. In some embodiments, sequence 316 may indicate which team or individual(s) are responsible or authorized to perform certain displayed activities.

It is a time-consuming task for user to try and identify where exactly an error exists in performing a multi-step task, particularly when user is executing some of the final transactions of the task or business cycle. For example, a user may be executing invoice creation at the end of the Purchase-Sales business cycle and the user may have entered the wrong payment terms or volume-quantity unit of measure of the purchased goods. While creating the invoicing, the user may see the error or wrong pricing information. DNS 102 may provide a feature that enables the user to quickly locate exactly where and in which module/transaction the error exists which is not allowing business cycle to get completed.

Sequence 316 of the end-to-end business cycle on which a user is working on may be based on the customization applicable on the business role of the user. Each node of the diagram or sequence 316 may be color coded based on the transactions assigned under that node. If any of the transaction in particular node is not saved properly or having errors, color code on the node level may become red in color. This will provide a simple one screen view of all the errors in the business cycle for a user.

The user may be able to click on the transactions or steps which have an error in the flow diagram or sequence 316 may be directly navigated to the transaction (e.g., screen 120) on which the error was identified or detected. The user can then correct the errors and can again save the data so that the color at the node level becomes green. If not all the transactions under the Node are executed, some part at the Node Level may be depicted in a grey color, giving user a clear idea that some transactions are still not executed and saved which are required to complete the business cycle.

Figure 4:
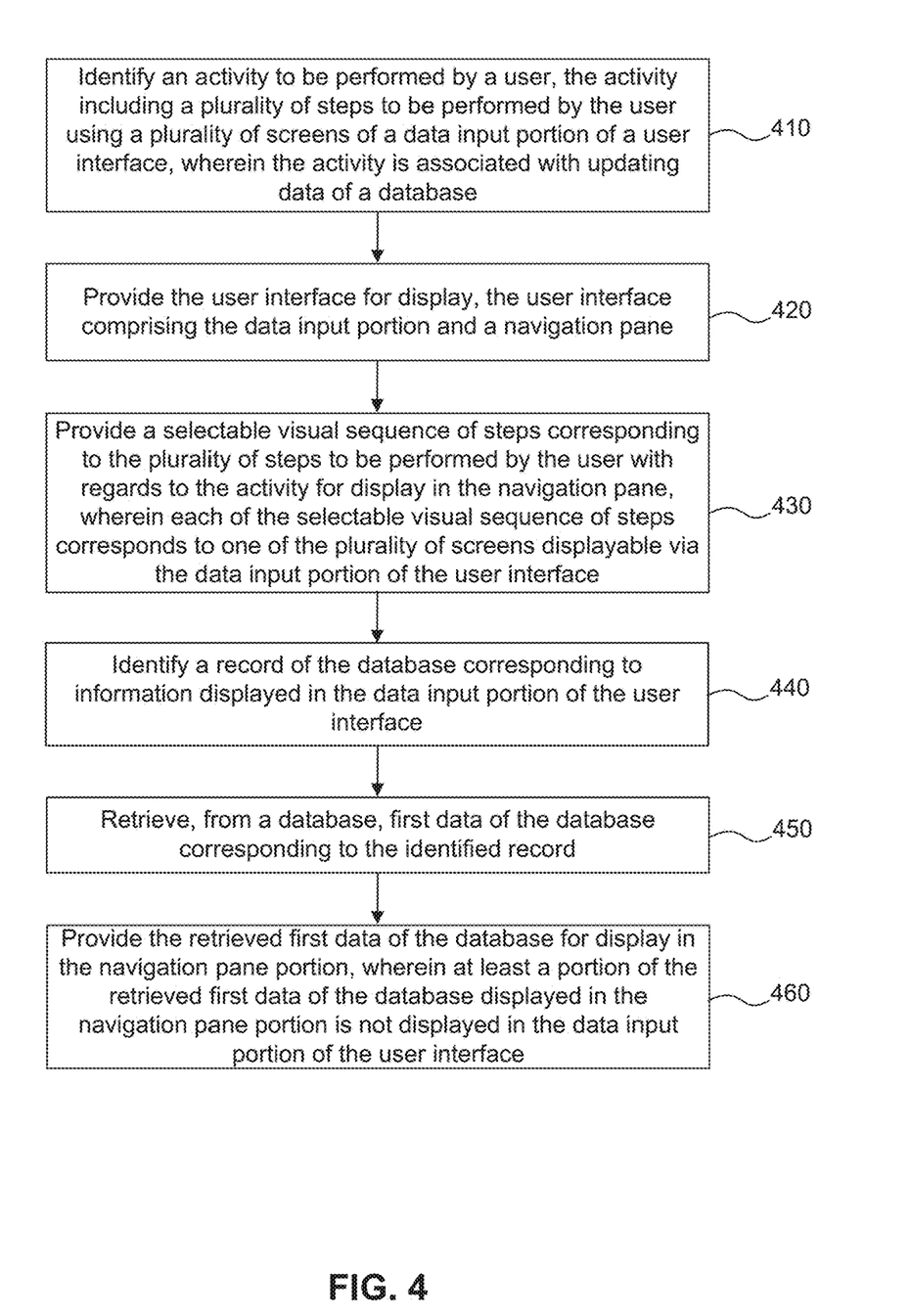
FIG. 4 is a flowchart illustrating a process for a dynamic navigation system (DNS), according to some embodiments.

FIG. 4 is a flowchart illustrating a process 400 for a dynamic navigation system (DNS) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1. However, method 400 is not limited to that example embodiment.

In 410, an activity to be performed by a user is identified, the activity including a plurality of steps to be performed by the user using a plurality of screens of a data input portion of a user interface, wherein the activity is associated with updating data of a database. For example, a user 104 may select an activity 122 to be performed from a navigation pane 114 which may display the various activities 122 for which there is navigable help available. The activity 122 may include a sequence 116 of steps 118 to be performed by the user 104 (and/or other users) using various screens 120 of application 106, The screens 120 may be displayed in the data input portion 112 of user interface 110.

In 420, the user interface is provided for display, the user interface comprising the data input portion and a navigation pane. For example, DNS 106 may provide user interface 110 for display on a mobile device or computing device, the user interface 110 including both a data input portion 112 and a collapsible navigation pane 114.

In 430, a selectable visual sequence of steps corresponding to the plurality of steps to be performed by the user with regards to the activity are provided for display in the navigation pane. For example, steps 218 may be provided for display in navigation pane 214, Each of the selectable (and non-selectable) visual sequence 216 of steps 218 corresponds to one of the plurality of screens 120 displayable via the data input portion 212 of the user interface 210.

In 440, a record of the database corresponding to information displayed in the data input portion of the user interface is identified. For example, DNS 102 may identify what information is displayed in the data input portion 212, such as the business partner number.

In 450, first data of the database corresponding to the identified record is retrieved from the database. For example, DNS 102 may retrieve records from various tables (BUT000, Contract Account) of database 108 corresponding to what is displayed in data input portion 212.

In 460, the retrieved first data of the database is provided for display in the navigation pane portion, wherein at least a portion of the retrieved first data of the database displayed in the navigation pane portion is not displayed in the data input portion of the user interface. For example, DNS 102 may display relevant data 224 in navigation pane 214. As illustrated, the relevant data 224 includes data that is not already displayed in the data input portion 212, but is part of the same record associated with information displayed in the data input portion 212.

Figure 5:
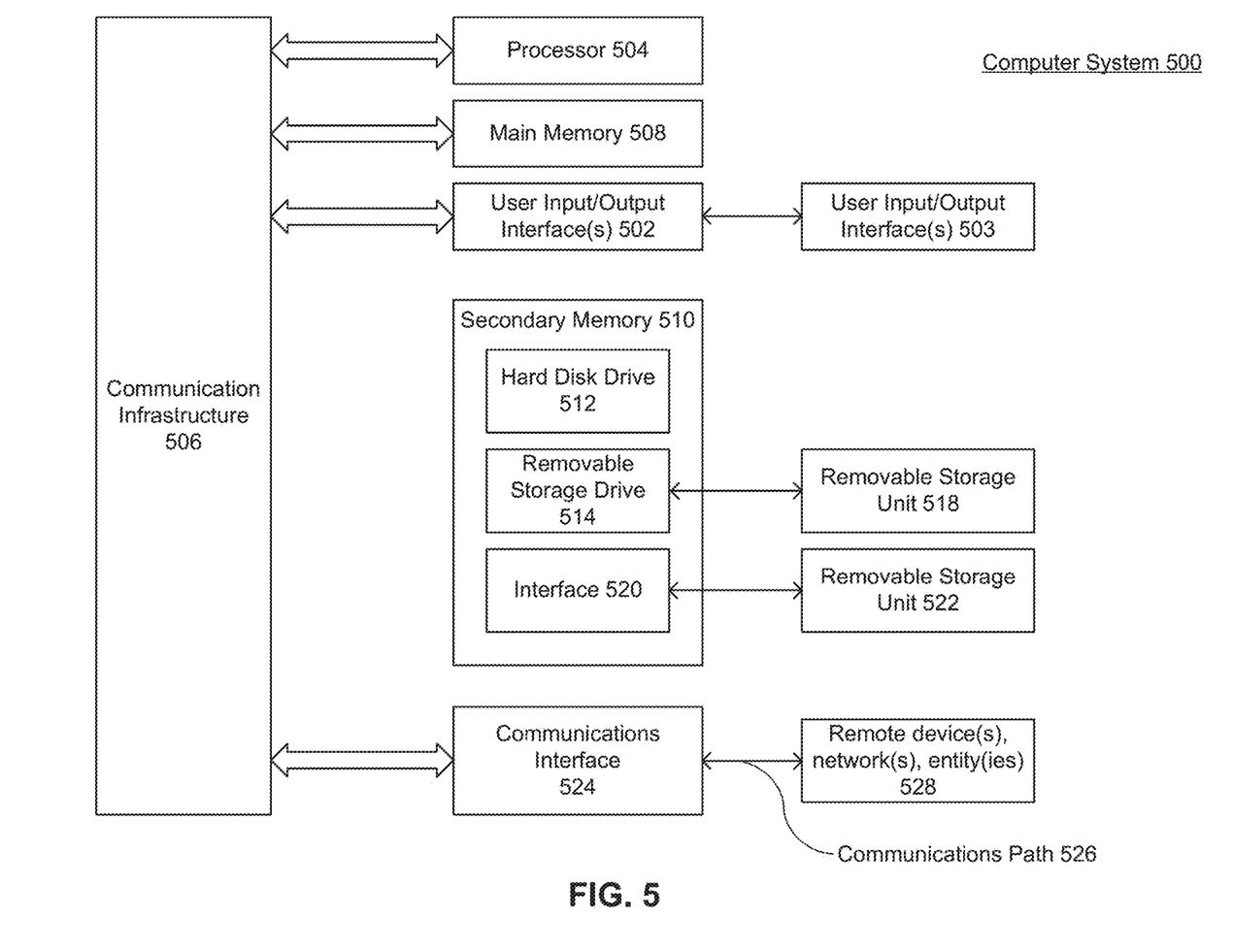
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 can be used to implement any embodiments of FIGS. 1-13, and/or any combination or sub-combination thereof.

Computer system 500 includes one or more processors (also called central processing units, or CPUs), such as a processor 504. Processor 504 is connected to a communication infrastructure or bus 506. Computer system 500 may represent or comprise one or more systems on chip (SOC).

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data, Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, memory card, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s)to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
identifying, by one or more processors an activity to be performed by a user, the activity including a plurality of steps to be performed by the user using a plurality of screens of a data input portion of a user interface, wherein the activity is associated with updating data of a database;
providing the user interface for display, the user interface comprising the data input portion and a navigation pane;
providing, by the one or more processors, a selectable visual sequence of steps corresponding to the plurality of steps to be performed by the user with regards to the activity for display in the navigation pane, wherein each of the selectable visual sequence of steps corresponds to one of the plurality of screens displayable via the data input portion of the user interface;
detecting input by the user provided in the data input portion of the user interface;
identifying a record of the database corresponding to the input provided by the user in the data input portion of the user interface;
retrieving, from a database, first data of the database corresponding to the identified record;
identifying a first portion of the first data that is related to data displayed in the data input portion of the user interface, wherein a second portion of the first data is not related to the data displayed in the data input portion of the user interface; and
providing, by the one or more processors, the first portion of the first data for display in the navigation pane portion, wherein at least a subset of the first portion of the first data displayed in the navigation pane portion is different from the data displayed in the data input portion of the user interface.

2. The method of claim 1, wherein at least a different portion of the retrieved first data of the database displayed in the navigation pane portion is identical to data is already displayed in the data input portion of the user interface.

3. The method of claim 1, further comprising:
receiving a selection of a first step of the selectable visual sequence of steps;
identifying a first screen, of the plurality of screens of the data input portion of the user interface, corresponding to the first step; and
displaying the first screen in the data input portion of the user interface.

4. The method of claim 3, further comprising:
retrieving updated data, corresponding to the first screen, from the database; and
providing the updated data for display in the navigation pane portion of the user interface.

5. The method of claim 1, further comprising:
receiving user input information entered into the data input portion of the user interface via a first screen of the plurality of screens of the data input portion of the user interface, the first screen corresponding to a first step of the selectable visual sequence of steps;
identifying a second step of the selectable visual sequence of steps subsequent to the first step;
identifying a second screen of the plurality of screens of the data input portion of the user interface corresponding to the second step;
retrieving second data from the database corresponding to the second screen, wherein the retrieved second data is displayed simultaneously with the provided retrieved first data;
providing for display in the user interface, the second screen in the data input portion of the user interface, and the retrieved second data in the navigation portion of the user interface.

6. The method of claim 1, further comprising:
receiving a request for a graphical illustration of a business cycle associated with the activity; and
providing for display, responsive to the request for the graphical illustration that includes the activity to be performed by the user displayed in a graphical sequence of activities to be performed both by the user and one or more other users.

7. The method of claim 6, wherein the graphical sequence of activities includes visual indicators of a status of each of the activities of the graphical sequence, the indicators including at least one error indicator.

8. A system comprising:
a memory; and
at least one processor coupled to the memory and configured to perform operations comprising:
identifying an activity to be performed by a user, the activity including a plurality of steps to be performed by the user using a plurality of screens of a data input portion of a user interface, wherein the activity is associated with updating data of a database;
providing the user interface for display, the user interface comprising the data input portion and a navigation pane;
providing a selectable visual sequence of steps corresponding to the plurality of steps to be performed by the user with regards to the activity for display in the navigation pane, wherein each of the selectable visual sequence of steps corresponds to one of the plurality of screens displayable via the data input portion of the user interface;
detecting input by the user provided in the data input portion of the user interface;
identifying a record of the database corresponding to the input provided by the user in the data input portion of the user interface;
retrieving, from a database, first data of the database corresponding to the identified record;
identifying a first portion of the first data that is related to data displayed in the data input portion of the user interface, wherein a second portion of the first data is not related to the data displayed in the data input portion of the user interface; and
providing the first portion of the first data for display in the navigation pane portion, wherein at least a subset of the first portion of the first data displayed in the navigation pane portion is different from the data displayed in the data input portion of the user interface.

9. The system of claim 8, wherein at least a different portion of the retrieved first data of the database displayed in the navigation pane portion is identical to data is already displayed in the data input portion of the user interface.

10. The system of claim 8, the operations further comprising:
receiving a selection of a first step of the selectable visual sequence of steps;
identifying a first screen, of the plurality of screens of the data input portion of the user interface, corresponding to the first step; and
displaying the first screen in the data input portion of the user interface.

11. The system of claim 10, the operations further comprising:
retrieving updated data, corresponding to the first screen, from the database; and
providing the updated data for display in the navigation pane portion of the user interface.

12. The system of claim 8, the operations further comprising:
receiving user input information entered into the data input portion of the user interface via a first screen of the plurality of screens of the data input portion of the user interface, the first screen corresponding to a first step of the selectable visual sequence of steps;
identifying a second step of the selectable visual sequence of steps subsequent to the first step;
identifying a second screen of the plurality of screens of the data input portion of the user interface corresponding to the second step;
retrieving second data from the database corresponding to the second screen, wherein the retrieved second data is displayed simultaneously with the provided retrieved first data;
providing for display in the user interface, the second screen in the data input portion of the user interface, and the retrieved second data in the navigation portion of the user interface.

13. The system of claim 8, the operations further comprising:
receiving a request for a graphical illustration of a business cycle associated with the activity; and
providing for display, responsive to the request for the graphical illustration that includes the activity to be performed by the user displayed in a graphical sequence of activities to be performed both by the user and one or more other users.

14. A non-transitory computer-readable medium having instructions stored thereon that, when executed by at least one computing device, cause the at least one computing device to perform operations comprising:
identifying an activity to be performed by a user, the activity including a plurality of steps to be performed by the user using a plurality of screens of a data input portion of a user interface, wherein the activity is associated with updating data of a database;
providing the user interface for display, the user interface comprising the data input portion and a navigation pane;
providing a selectable visual sequence of steps corresponding to the plurality of steps to be performed by the user with regards to the activity for display in the navigation pane, wherein each of the selectable visual sequence of steps corresponds to one of the plurality of screens displayable via the data input portion of the user interface;
detecting input by the user provided in the data input portion of the user interface;
identifying a record of the database corresponding to the input provided by the user in the data input portion of the user interface;
retrieving, from a database, first data of the database corresponding to the identified record;
identifying a first portion of the first data that is related to data displayed in the data input portion of the user interface, wherein a second portion of the first data is not related to the data displa red in the data input portion of the user interface; and
providing the first portion of the first data for display in the navigation pane portion, wherein at least a subset of the first portion of the first data displayed in the navigation pane portion is different from the data displayed in the data input portion of the user interface.

15. The non-transitory computer-readable medium of claim 14, wherein at least a different portion of the retrieved first data of the database displayed in the navigation pane portion is identical to data is already displayed in the data input portion of the user interface.

16. The non-transitory computer-readable medium of claim 15, the operations further comprising:
receiving a selection of a first step of the selectable visual sequence of steps;

identifying a first screen, of the plurality of screens of the data input portion of the user interface, corresponding to the first step; and displaying the first screen in the data input portion of the user interface.

17. The non-transitory computer-readable medium of claim 16, the operations further comprising:

retrieving updated data, corresponding to the first screen, from the database; and providing the updated data for display in the navigation pane portion of the user interface.

18. The non-transitory computer-readable medium of claim 14, the operations further comprising:

receiving user input information entered into the data input portion of the user interface via a first screen of the plurality of screens of the data input portion of the user interface, the first screen corresponding to a first step of the selectable visual sequence of steps;

identifying a second step of the selectable visual sequence of steps subsequent to the first step;

identifying a second screen of the plurality of screens of the data input portion of the user interface corresponding to the second step;

retrieving second data from the database corresponding to the second screen, wherein the retrieved second data is displayed simultaneously with the provided retrieved first data;

providing for display in the user interface, the second screen in the data input portion of the user interface, and the retrieved second data in the navigation portion of the user interface.

19. The non-transitory computer-readable medium of claim 14, the operations further comprising:

receiving a request for a graphical illustration of a business cycle associated with the activity; and providing for display, responsive to the request for the graphical illustration that includes the activity to be performed by the user displayed in a graphical sequence of activities to be performed both by the user and one or more other users, wherein the graphical sequence of activities includes visual indicators of a status of each of the activities of the graphical sequence, the indicators including at least one error indicator.

20. The method of claim 1, wherein the first portion of data comprises data that is impacted if any data displayed in the data input portion changes.

* * * * *